(12) United States Patent
Chin et al.

(10) Patent No.: US 11,941,312 B2
(45) Date of Patent: Mar. 26, 2024

(54) PRINT JOB MANAGEMENT OF USAGE DATA AND CONSUMPTION DATA

(71) Applicant: Hewlett-Packard Development Company, L.P., Spring, TX (US)

(72) Inventors: Rachel L. Chin, Vancouver, WA (US); Michael St. Laurent, Kitchener (CA); Phillip A. Mccoog, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/921,122

(22) PCT Filed: May 11, 2020

(86) PCT No.: PCT/US2020/032336
§ 371 (c)(1),
(2) Date: Oct. 25, 2022

(87) PCT Pub. No.: WO2021/230853
PCT Pub. Date: Nov. 18, 2021

(65) Prior Publication Data
US 2023/0176801 A1    Jun. 8, 2023

(51) Int. Cl.
*G06F 3/12* (2006.01)
*H04N 1/34* (2006.01)

(52) U.S. Cl.
CPC .......... *G06F 3/1273* (2013.01); *G06F 3/1204* (2013.01); *G06F 3/126* (2013.01); *H04N 1/34* (2013.01)

(58) Field of Classification Search
None
See application file for complete search history.

(56) References Cited

U.S. PATENT DOCUMENTS

| 4,819,035 A | 4/1989 | Arai et al. |
| 5,264,948 A | 11/1993 | Imoto |
| 6,983,188 B2 | 1/2006 | Loughran et al. |
| 10,402,295 B1 | 9/2019 | Beiriger et al. |
| 2007/0103716 A1 | 5/2007 | Shiraiwa et al. |
| 2011/0058211 A1 | 3/2011 | Noecker, Jr. et al. |
| 2014/0211232 A1 | 7/2014 | Ganesan et al. |
| 2016/0070514 A1* | 3/2016 | Bhaskaran ............ G06F 3/1219 358/1.14 |
| 2020/0004470 A1 | 1/2020 | Daams et al. |
| 2020/0356321 A1* | 11/2020 | Suzuki .................... G06F 3/126 |

FOREIGN PATENT DOCUMENTS

WO    2014/120187 A1    8/2014

* cited by examiner

*Primary Examiner* — Frantz Bataille
(74) *Attorney, Agent, or Firm* — Michael Dryja (57) ABSTRACT

An example method includes providing access to a database of a plurality of print devices registered to a print system, and receiving print data that identifies a print job for a print device among the plurality of print devices and a first account for a first service of the print system. The method further includes managing the print job including applying usage data for the print job to the first account based on the print data, and applying consumption data for the print job to a second account based on the print data, the second account being associated with the print device and a second service of the print system.

12 Claims, 4 Drawing Sheets

PRINT JOB MANAGEMENT OF USAGE DATA AND CONSUMPTION DATA

BACKGROUND

Documents may be used to present information and may be in electronic or printed form. While electronic documents may be stored more easily, printed documents continue to be used for a variety of purposes. Print devices may produce the printed documents using data received over a network.

DETAILED DESCRIPTION

In the following detailed description, reference is made to the accompanying drawings which form a part hereof, and in which is shown by way of illustration, specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Documents may be used to disseminate information and may include printed forms. A printed document may be produced by a print device based on data received from a computing device. A print device, as used herein, includes or refers to a device that makes a representation of text or graphics on physical media. The print device may form markings, such as using liquid print fluids or powdered ink, on the print media based on the data received. Users of print devices may print documents within a contractual print system. For example, the system may include print devices and/or consumables which are provided to the user by a service provider, and the service provider may maintain the print devices, such as replacing parts and/or refilling consumables. The system may be based on service plans that identify a number of pages printed per billing cycle and/or a pre-paid amount of pages. The service provider may manage billing for providing the service, refill consumables and/or perform maintenance on the print device. Various users may intend to print documents when at an infrequently visited location, such as when they are traveling. Other users may not have a print device, and may intend to use a publically available print device. However, it may be cumbersome for the owner of a publically available print device to provide access to the print device and to obtain billing data for collecting a credit for a print job requested by a user.

Examples of the present disclosure are directed to a print system which manages a register of a plurality of network-connected print devices. The print devices include commercial print devices and consumer print devices which may be accessible over a network to users that are registered to the system. The system separately tracks print jobs for respective users against accounts of the respective users and credits consumption for the print jobs to accounts of respective print devices used to produce the printed documents. An owner of the print device may receive credit for a plurality of print jobs from the system and/or may have consumable supply replenished, without tracking billing data for different users and/or without tracking the printing use. Users that register to the print system may access any of the publically available print devices.

The print system may be cloud-based, which may be referred to as a "cloud-based print system", and may provide a plurality of services. The print system may offer different types of services which may be consumer-based and commercial-based. For example, the plurality of services may include a plurality of print services associated with a plurality of accounts and a plurality of users.

Figure 1:
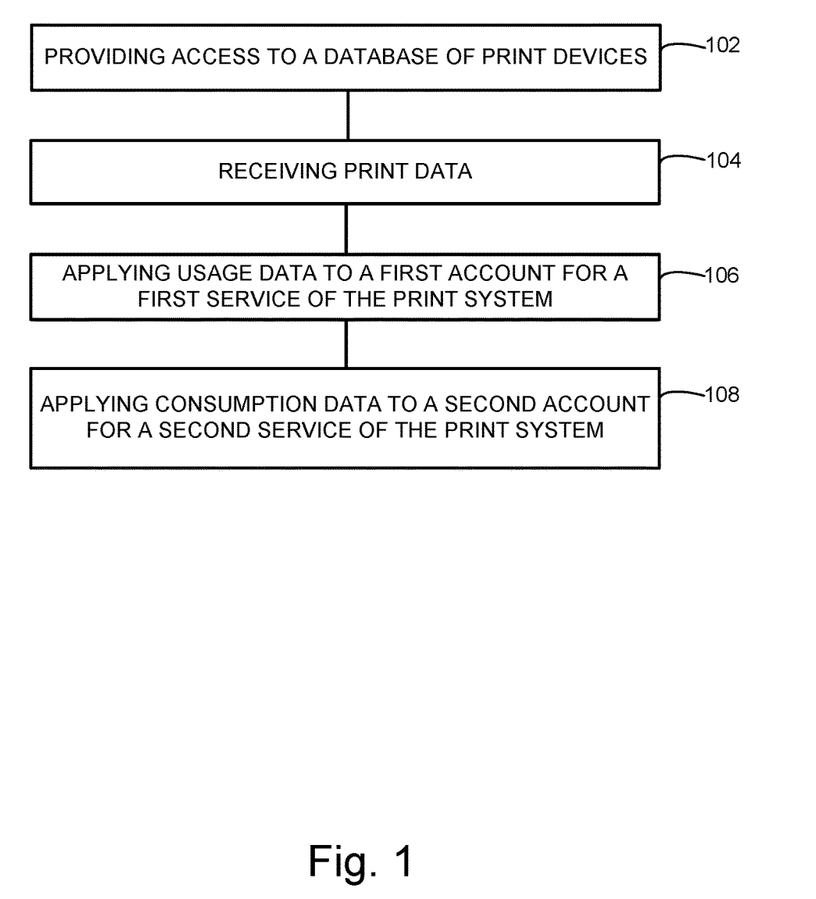
FIG. 1 is a flow diagram illustrating an example method of print job management, in accordance with examples of the present disclosure.

FIG. 1 is a flow diagram illustrating an example method of print job management, in accordance with examples of the present disclosure. The method may be performed by a print system which provides a plurality of services, such as different contractual-based print services.

At 102, the method includes providing access to a database of a plurality of print devices registered to the print system. Each of the plurality of print devices are network-enabled and may communicate with other devices and/or the service provider via a network.

The print devices may be located at private locations, at publically accessible locations, and/or at locations associated with an organization, which may or may not be publically accessible. The plurality of print devices may be inter-organizational in that the plurality include print devices of a plurality of different organizations and individuals, such as commercial entities and consumers, which are all inter-connected via the print system. The print devices may thereby form a network of inter-organizational print devices associated with different accounts and different contractual services of the print system.

Examples of different services of the print system include a subscription service, a pre-paid service, a consumable refill service, and a service for tracking consumption data, as well as combinations thereof. The services may be provided to a private consumer, to an organization of a plurality of users, and/or to an owner of a print device or a plurality of print devices. Organizations may be consumer-based, such as a family located in a residence or multiple residences, or may be commercial-based, such as a commercial or charitable entity. Each service is associated with an account that identifies a user or a plurality of users, the type of service, and billing data.

A subscription service may include a service provided on a contractual basis for a period of time and for an agreed to amount. Example subscription services include a consumer or commercial service for a predefined number of printed pages, such as an automatic monthly payment for the pages or an automatic payment when the number of pages are depleted or used, which may be referred to as a pre-paid subscription service.

With a pre-paid service, a user may manually bill an amount in response to a number of pages in the account being depleted, and/or the account is automatically billed a set amount in response the depletion, such as with a pre-paid subscription service. The amount of pre-paid service and/or page count may be changed over time by a user of the account.

A consumable refill service may include tracking of consumption data and providing automatic replacement of consumables of the print device, which may be ordered and refilled by the service provider. In various examples, the consumable refill service includes a subscription service and/or pre-paid service which is calculated based on a number of pages. For example, a consumer or an organization may pay a fee that corresponds to a predefined number of pages, which is automatically renewed and paid each billing cycle or other period of time and/or when the number of pages are depleted or manually renewed. Consumables, as used herein, include supply which is consumed by a print device during the print process. For example, when the print device identifies a consumable has reached a threshold level, the print device may communicate with the service provider, and the service provider may automatically refill the consumable. Example consumables include black ink or toner, color ink, print cartridges, print media, finishing supplies, such as staples, glue, and tape, and/or other items.

A service for tracking consumption data may include tracking the consumption data and providing an account with consumption credit based on the tracked consumption data. As further described herein, an owner of the print device may utilize the print system to publically provide the print device for executing print jobs and receives monetary or other types of credit for the print jobs without tracking billing data.

The following provides a number of specific examples of services provided by the print system. As one example, an individual consumer pays a monthly fee for a number of pages printed per month. The print system may count the number of pages produced by print devices across the print system for the user or may use a more complex counting, such as taking into account a type of consumable used. As another example, an organization may have an account that is associated with a plurality of users, such as employees of an employer. The organization may pay a monthly fee for a number of pages per month. As a further example, an owner of a print device may have an account for a print service. The print service may include a monthly fee for refilling consumable supply for the print device and/or an agreement to track consumption data for print jobs for the print device. The account is provided with a consumption credit based on the tracked consumption data, such as monetary compensation and/or reduced monthly payments for the print service.

The print devices may be registered to the database by the service provider of the print system. The registration process may include storing device data for each of the plurality of print devices in the database. The device data includes identifying information, such as an email address, a media access control address, and/or a print identifier (ID) for the print device, a type and/or model of the print device, capabilities of the print device, a geographic location of the print device, identification of an account and/or service associated with the print device, and/or accessibility rules, among other data.

In some examples, the print devices may be associated with rules for accessing the respective print device for print jobs. For example, a first subset of the plurality of print devices may be accessible for print jobs by a particular user or subset of users, such as print devices located at a residence of user, or a particular print device of a commercial entity which is accessible to employees or to a subset of the public. A second subset of the plurality of print devices may be accessible to any user that is registered with the print system. For example, a print device may be registered with the service provider and the accessibility is updated to allow public access to the print device.

At 104, the method includes receiving print data that identifies a print job for a print device among the plurality of print devices and a first account for a first service of the print system. The print data may be received over a network, such as from a computing device. As used herein, a print job includes or refers to a file or set of files to be submitted to a print device, such as a data object that represents a document to be printed. The print data includes information about the print job. For example, the print data may include the print job, identification of a selected print device, and/or identification of a service or account associated with the request for the print job. The print data may represent the print job in a format, such as a word processing format used to create the document. In various examples, the print data may not include the print job in its entirety, but includes information about the print job relevant for tracking usage data and consumption data, including identification of the associated accounts to apply the usage and consumption data to.

The first account may be associated with a user which requests the print job using a computing device. The user may include an individual consumer or a user of an organization. The user, in some specific examples, may be associated with a plurality of accounts and may select one of the plurality when requesting the print job. The print system may further include a second database with data identifying the services provided by the print system and associated accounts, as further described herein.

The user may be provided with access to the database to select a particular print device for the print job. The access to the database may include searchable access provided via a computing device. For example, the database may store identification of the print devices based on or including a plurality of parameters of the print devices. The plurality of parameters may include a geographic location, capabilities, such as color printing, finishing options, type of ink or media, double-sided printing, etc., and/or an owner of the print device. The user may search the database based on the parameters to identify a print device. As a specific example, a user may search for a subset of the plurality of print devices which are owned by a particular organization, such as identifying a network of print devices for a commercial entity.

At 106, the method includes applying usage data for the print job to the first account based on the print data. Usage data, as used herein, includes or refers to data representing execution of the print job, such as an amount or type of printing for a printed document associated with the print job. The usage data may include a page count of the print job, a type of print job and/or consumable supply used to execute the print job. Applying the usage data may include identifying the page count and deducting the page count from the first account. For example, the usage data includes and/or is used to determine a print credit which is added to or deducted from an account. A print credit, as used herein, includes a credit for the usage data and/or for the print job which is added or deducted from an account. The subscription plan may include a number of pages associated with the first account, such as a number of pages printed per month or billing cycle. As a specific example, the usage data includes a number of pages and the print credit includes a deduction of the number of pages from the first account for the first service, such as deducting from stored service data for the first service, as further described herein.

At 108, the method further includes applying consumption data for the print job to a second account based on the print data. The second account is associated with the print device and a second service of the print system. For example, the second service may include a consumable refill service and/or a service for tracking consumption data. The consumption data includes or refers to data representing consumption of a consumable by the print device for execution of the print job. In specific examples, the consumption data is the same as the usage data, such as a page count. The consumption data may include or be used to determine a consumption credit. A consumption credit includes a credit for the consumption data and/or for the print job executed which is added to or deducted from an account. The consumption credit may include a monetary credit, such as a monetary amount that is tracked over time and/or a credit against the fee for the service, and/or an indication of consumable supply consumed. As an example, applying the consumption data to the second account includes associating the consumption credit to the second account based on and/or including the page count of the print job, such as adding to stored service data for the second service, as further described herein. In some examples, the consumption of consumable supply is tracked per print job and in other examples, the print device may communicate a message when the consumable supply reaches a threshold level indicating a refill action.

The print job may be provided to the print device and the print device may execute the print job. The print device may generate a printed document based on the print job. The print job may be provided to the print device while keeping data associated with the first account confidential from the print device and/or from an owner of the print device. For example, the print device executes the print job and the consumption data for the print job is applied to the second account without the owner of the print device collecting billing data for the user.

In some specific examples, the first and second accounts are the same account. For example, the user may select a home printer or a print device of their employer. In such examples, the usage data and consumption data may be identical and is applied to the account once.

In a number of related examples, the method further includes tracking usage data of a plurality of print jobs across the plurality of print devices, and tracking consumption data for the plurality of print jobs. The plurality of print jobs include the print job. The usage data is applied to accounts associated with respective users requesting the print jobs, and the consumption data is applied to accounts associated with the respective print devices executing the print jobs. For example, a plurality of different users associated with different user accounts may utilize a particular print device for print jobs and the owner of the print job is credited with consumption data for the print jobs without individually charging the users. The owner of the print device may publically offer the print device for use to provide print services and is credited with consumption credits without tracking the print jobs and/or without managing billing data.

Figure 2:
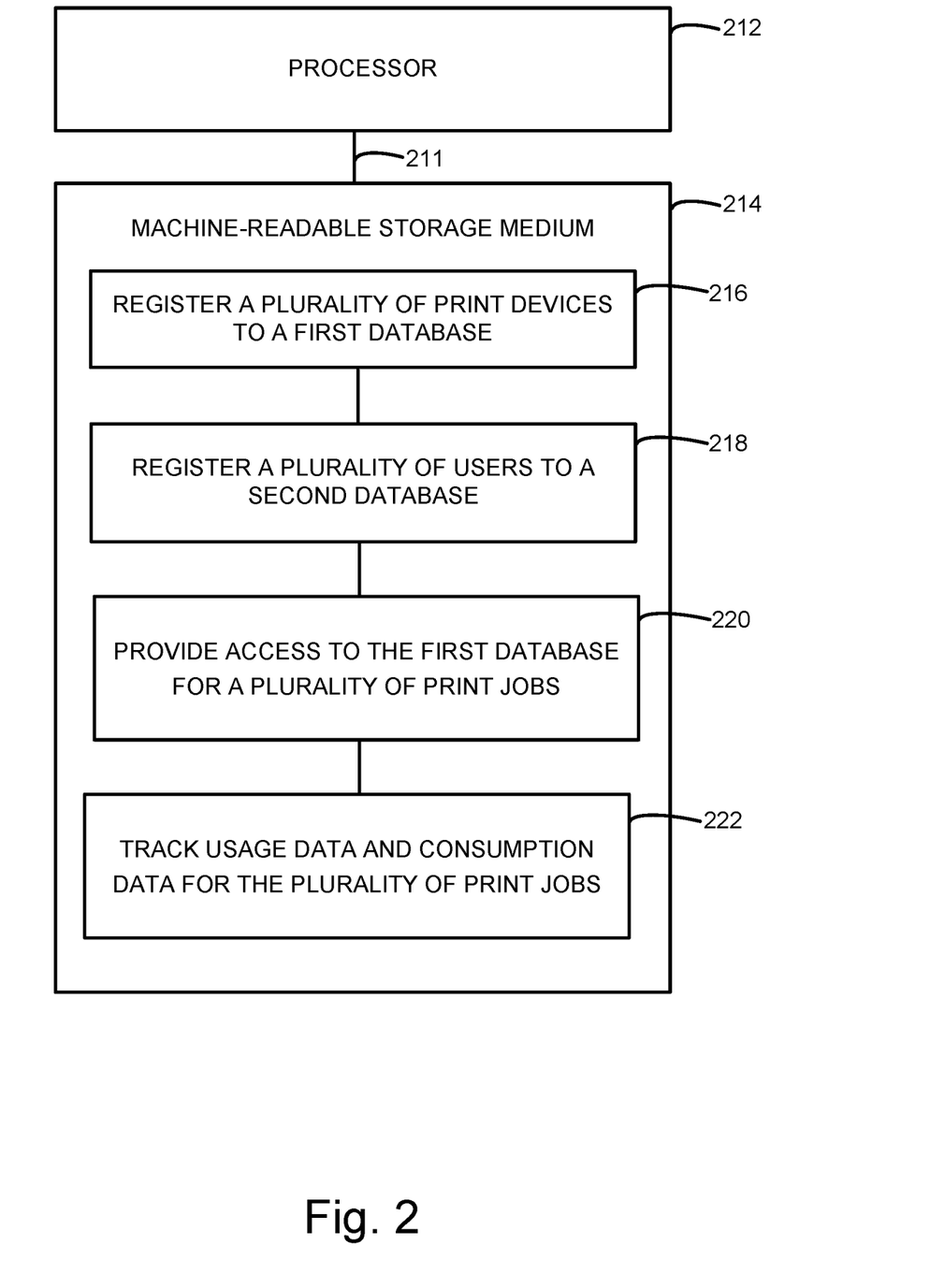
FIG. 2 is a block diagram illustrating an example computing device including non-transitory machine-readable storage medium, in accordance with examples of the present disclosure.

FIG. 2 is a block diagram illustrating an example computing device that includes non-transitory machine-readable storage medium, in accordance with examples of the present disclosure. The computing device may form part of the print system and is used to provide and/or manage print services of the print system, as described above in connection with FIG. 1.

The computing device includes a processor 212 and a machine-readable storage medium 214 storing a set of machine-executable instructions 216, 218, 220, 222 that are executable by the processor 212. The processor 212 is communicatively coupled to the machine-readable storage medium 214 through a communication path 211. The machine-readable storage medium 214 may, for example, include read-only memory (ROM), random-access memory (RAM), electrically erasable programmable read-only memory (EEPROM), Flash memory, a solid state drive, and/or discrete data register sets. The processor 212 may include a central processing unit (CPU) or another suitable processor.

Although FIG. 2 illustrates a single processor 212 and a single machine-readable storage medium 214, examples are not so limited and may be directed to an apparatus and/or multiple computing devices with multiple processors and multiple machine-readable storage mediums. The instructions may be distributed and stored across the multiple machine-readable storage mediums and may be distributed and executed by the multiple processors.

The processor 212 may execute instructions 216 to register a plurality of print devices to a first database of the print system. The registration of the print devices may include storing device data in the first database, such as the database of print devices as previously described. The processor 212 executes instructions 218 to register a plurality of users to a second database of the print system. The second database may include a plurality of services associated with a plurality of accounts and the plurality of users, such as a plurality of print services.

Registering the users may include storing service data in the second database. The service data may include identification of the type of service, account information, billing data, shipping data, usage data, and balance information, among other data. Balance information includes data indicative of service and/or funds remaining for the account, such as a number of print credits and/or number of pages remaining. As specific examples, the service data includes a number of pages the account is allocated per period of time, and a remaining amount of the number of pages for the current period of time. The account information may include a user or multiple users associated with the account of the service including user names, emails and passwords, permission levels, etc., and which may be updated over time. Registration of the users may include adding print services and associated accounts and/or adding users to existing print services and associated accounts.

The processor 212 further executes instructions 220 to provide access to the first database to the plurality of users for a plurality of print jobs associated with the plurality of print services. As noted above, the plurality of print devices may be stored in the first database based on a plurality of parameters. For example, the processor 212 may store identification of the plurality of print devices in the first database based on the plurality of parameters and provide access to the first database to the plurality of users based on the plurality of parameters. In various examples, the access to the first database may be based on access rules defined in the second database. For example, the service data may identify subsets of the plurality of users in the second database which may access particular print devices in the first database.

The processor 212 executes instructions 222 to track usage data for the plurality of print jobs and consumption data of print devices for the plurality of print jobs. The tracked usage data and consumption data may be based on a page count for each of the plurality of print jobs, which may be confirmed by respective print devices. For example, the processor 212 may provide the plurality of print jobs to respective print devices of the plurality as identified in received print data. In other examples and/or in addition, the print jobs are communicated from computing devices of the users to the print devices. The print devices may communicate confirmation of execution of the print job, including a page count.

The tracked consumption data may be used to provide consumption credit to the account(s) associated with the respective print devices and/or to provide consumable refill service(s). For example, the processor 212 may provide a monetary credit to the account associated with a particular print device. In various examples, the processor 212 may communicate an order form to a vendor for a consumable for a print device among the plurality of print devices, such as a print cartridge. The processor 212 may dispatch the consumable to an address specified by the particular account associated with print device based on the order form and the first database, which may occur automatically and/or without action by a user of the particular account.

The first database, second database, and the computing device may include or be on the same server within the print system or different servers which are in communication with each other, such as in a cloud-based print system. In various examples, as further illustrated herein, the processor 212 may execute the instructions 216, 218, 220, 222 to operate a service manager of the print system. The service manager manages the plurality of services offered by the print system including, for example, defining the plurality of services, managing service lifecycles, registering accounts for services and users to the services, registering print devices, and tracking usage data and consumption data. The service manager may communicate with the services, which may be externally stored, such as through an application programming interface (API), without having to add further features and/or programming to the services. For example, a network interface of the computing device may communicate with the services via use of an API.

Figure 3:
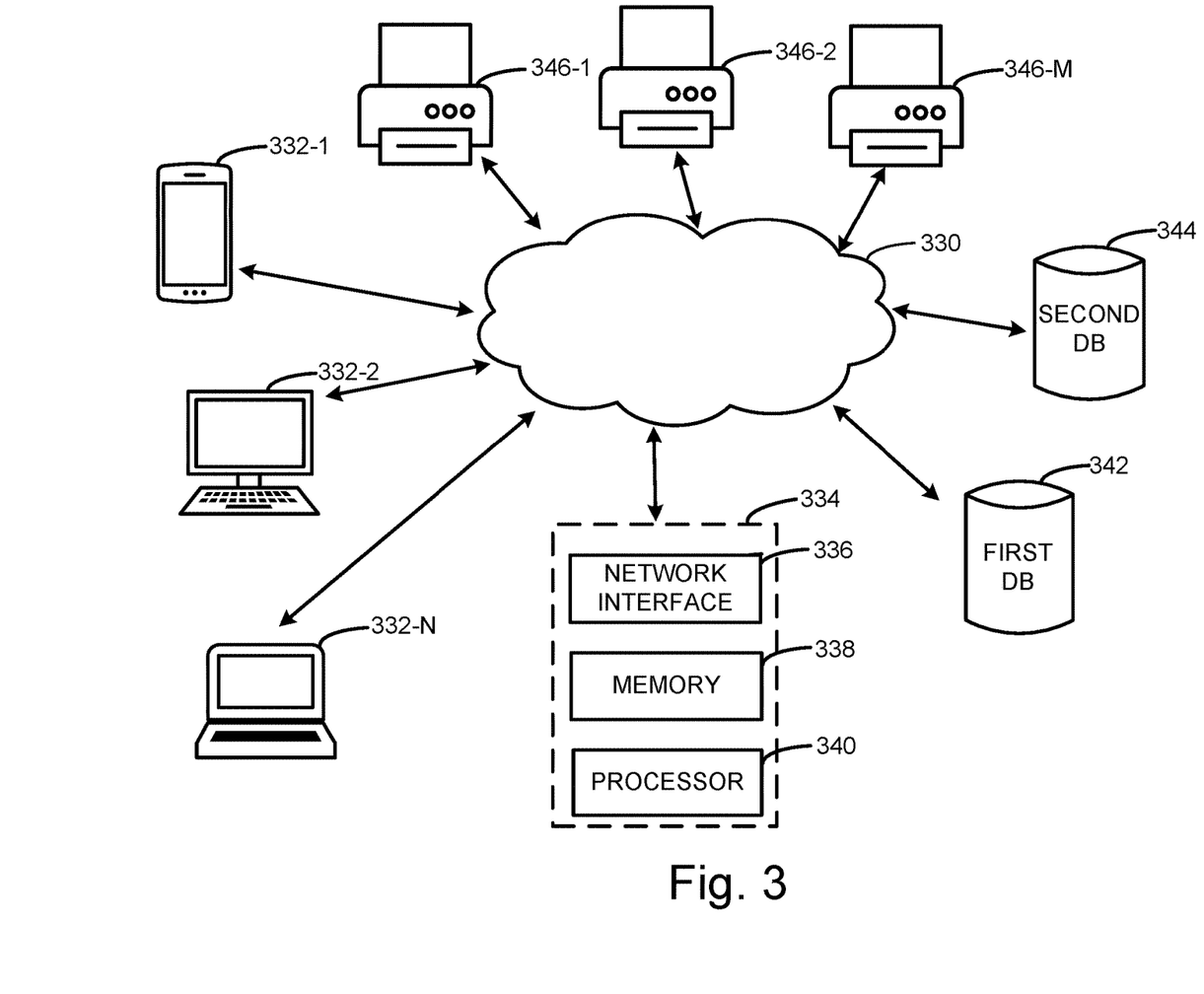
FIG. 3 is a block diagram illustrating an example environment including an apparatus for print job management, in accordance with examples of the present disclosure.

FIG. 3 is a block diagram illustrating an example environment including an apparatus for print job management, in accordance with examples of the present disclosure. Each device of the print system may be network connected such that the different devices may communicate to one another via the network 330. The network 330 may include a wired and/or wireless network, and may include a cellular wireless network. In the particular example, an apparatus 334 of the environment is illustrated in dashed lines as components of the apparatus 334 may be formed on a single server or across many servers.

The print system may include distributed components which communicate via the network 330. The print system provides services across the network 330, which may be processed and data may be stored in a distributed manner. For example, the first and second databases 342, 344 may each include single components or multiple storage components which form a distributed network of memory devices. Similarly, the memory 338 and the processor 340 may be distributed or may be on the same server. More specifically, the processor 340 may be a single processor, a plurality of processors, or a plurality of processors on separate servers.

The print system includes a plurality of computing devices 332-1, 332-2, 332-N (herein generally referred to as "computing devices 332"), a plurality of print devices 346-1, 346-2, 346-M (herein generally referred to as "print devices 346"), a first database 342, a second database 344, and the apparatus 334. The computing devices 332 may be operated by registered users. Example computing devices include mobile phones, laptop computers, tablets, desktop computers, and other devices.

The first database 342 of the plurality of print devices registered to the print system may include stored device data. The second database 344 of the plurality of print services of the print system may include stored service data. For example, a plurality of users may be registered to the second database 344.

The print devices 346 are inter-organizational and may be associated with differently structured print services. As previously noted, the print devices 346 may include different consumer owned print devices and commercial owned print devices. For example, a subset of the print devices 346 may be owned by a first organization and, optionally, may be at different geographic locations. As a specific example, a hotel chain may have a subscription plan for a first print service and may own a subset of the print devices 346, which are associated with the first print service. As another example, a coffee shop owner may have a subscription plan for a second print service and may own one of the print devices 346 which is associated with the second print service. As a further example, a user may have an account for a home-based print device which is associated with a third print service.

The apparatus 334 may be a server and includes a memory 338 to store a set of instructions and a processor 340, and may include a network interface 336 to communicate with other devices over the network 330. The memory 338 stores a set of instructions. The processor 340 may execute the set of instructions to provide access to the first database 342 to the plurality of users. A user may be provided access to the plurality of print devices 346, on-the-go, and without providing billing data to the owners of the print devices 346.

The processor 340 may identify a plurality of print jobs associated with the plurality of print services based on print data. The processor 340 may track usage data for the plurality of print jobs across the print devices 346 and provide print credit to a first plurality of accounts associated with the plurality of users in the second database 344 based on the usage data. The processor 340 may further track consumption data of the print devices 346 and provide consumption credit to a second plurality of accounts associated with the print devices 346 in the first database 342 based on the consumption data. The first plurality of accounts and second plurality of accounts may overlap, such as when a user prints to a home print device or a user prints to a print device of an employer for purposes of work. As previously described, the tracking of data and providing of credit may include storing service data, such as deducting print credits, and storing consumption data, such as adding consumption credits.

The processor 340 may route a print job to a print device among the print devices 346 based on print data for the print job among the plurality of print jobs. For example, the print job is routed while keeping billing data of a first account, of the first plurality of accounts, confidential from the print device and/or an owner of the print device. Alternatively and/or in addition, one of the computing devices 332 routes the print job to the respective print device, without providing billing data and, optionally, without providing other identifying data. The processor 340 may provide the print credit to the first plurality of accounts in the second database 344 based on the usage data and, optionally, in response to confirmation of execution of the plurality of print jobs received from respective ones of the print devices 346.

The computing devices 332 may be used by registered users to access the first database 342. Each computing device 332 may include a network interface to send and receive data over the network 330, a memory to store instructions, and a processor to execute the instructions to perform various actions. In some examples, users may register to the second database 344 using the one of computing devices 332. In other examples and/or in addition, the users may already be registered or may be registered using one of the print devices 346. The computing devices 332 may access the first database 342 using respective network interfaces and may search the first database 342 to identify a target print device for a print job. The computing devices 332 may communicate print data to the apparatus 334 of the print system. The print data may identify the target print device of the print devices 346, one of the plurality of accounts associated with the user, and data representing the document to be printed. The print job may be sent to the target print device by the apparatus 334 or by the computing device directly.

The print devices 346 may each include a network interface to send and receive data over the network 330, a memory to store instructions, and a processor to execute the instructions to perform various actions. For example, each of the print devices 346 may register, via a network interface, to the first database 342 and may be used to execute a plurality of print jobs received over the network 330, with the plurality of print jobs being associated with the different accounts of the print system and for providing the plurality of print services of the second database 344.

Although examples are not so limited and the print devices 346 may be registered to the first database 342 by one of the computing devices 332 and/or one of the print devices 346 may be used to register to the first database 342 and to register a user and/or an account for a print service with the second database 344.

As a specific example, a user may purchase a particular print device and may use the print device or the computing device to register to the first database 342 and the second database 344. To register with the second database 344, the user provides service data such as selecting a type of print service and providing account information. To register with the first database 342, the user may provide an indication to make the print device available to other users, and optionally verifies device data, such as a geographic location and/or device capabilities. The apparatus 334 stores the device data in the first database 342 and stores the service data in the second database 344.

In specific examples, the print job may be executed by one of the print devices 346 in response to one of the computing devices 332 being within a threshold range of the print device or in response to a communication from the computing device. The computing device may be associated with the account that requests the print job. For example, for security and other purposes, a user may desire for the printed document to not be printed until they are at the location of the print device. The print device may determine the computing device is within a threshold distance in response to receiving a communication, such a short-range technology communication including a near-field communication (NFC) and/or a radio-frequency identification (RFID) communication. In such examples, the print device may further include an NFC interface and/or RFID interface that may detect the communication.

In other examples, a user may set the threshold range and/or a time for print execution when requesting the print job. For example, a user may set the print job to execute in twenty minutes or a specific day at a specific time. As a further example, the print job may be executed when the user is en route to the location of the print device.

In some examples, the print devices 346 may communicate printer status data to the service provider, such as to the apparatus 334. The printer status data may include indications of errors, problems, and/or consumable supply reaching a threshold level. The service provider may use the printer status data to determine when replacement consumables are to be ordered and shipped according to the service associated with the print device.

Figure 4:
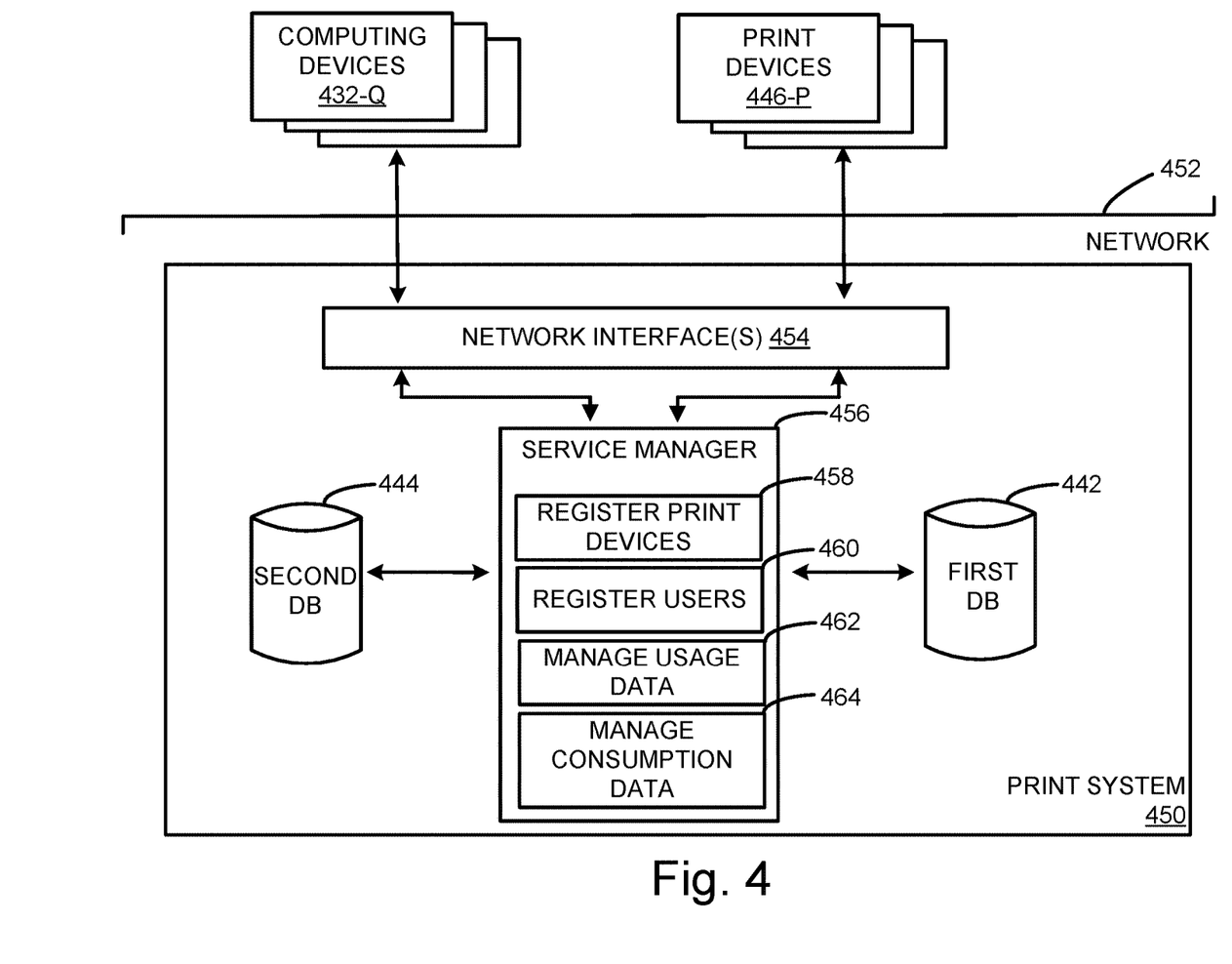
FIG. 4 a block diagram illustrating an example print system for print job management, in accordance with examples of the present disclosure.

FIG. 4 a block diagram illustrating an example print system for print job management, in accordance with examples of the present disclosure. The print system 450 may provide a registration process for print devices for consumer users and commercial users, and may manage usage data and consumption data. The print system 450 may be implemented by a remote service provider. The print system 450 may be used to provide a portal to receive service data and/or device data as part of a registration process from print devices 446-P and/or computing devices 432-Q and includes a service manager 456 to manage the services for different registered users. Logic may be implemented with various machine-readable instructions and/or firmware or hardware of a computer system that implements the print system 450, such as a plurality of distributed processor and memory resources.

The components of the print system 450 may be implemented on a computing device, such as a server, a laptop, a computing device, or on a plurality of computing devices that may communicate with one another and with other devices over the network 452. The computing device may operate to execute machine-readable instructions, such as described above, to perform the processes described herein and related to the various components of the print system 450. The print system 450 may be cloud-based, for example, and/or may be implemented through other computer systems in alternative architectures, such as a peer-to-peer network.

The print system 450 may communicate with computing devices 432-Q and print devices 446-P over a network 452 using a network interface 454. In various examples, the print system 450 includes a plurality of network interfaces for communicating over a plurality of networks, such as wireless and wired networks. In a specific example, the print system 450 communicates with the computing devices 432-Q via the network interface 454 and a portal or an API.

The print system 450 includes a service manager 456 that manages a plurality of services for different users and/or organizations registered with the print system 450. The service manager 456 provides a registration process in which a user may register the user or an associated organization with a service for use with the print devices 446-P, at 460, and may register print devices 446-P to be accessible as user defined, at 458. In a particular example, a portal is provided to a user, which may be accessed via a webpage displayed on or via an application operated by a respective one of the computing devices 432-Q. The portal provides a user interface in which the user may provide service data, such as account information, billing data, and selection of a service, and the user may provide device data, such as indicating whom may access the print device. The service manager 456 stores the device data in the first database 442 and stores the service data in the second database 444. In other examples, the service data and/or device data is provided by the print devices 446-P. For example, a user may interact with a respective print device to provide the service data and/or print data to the print system 450 via access of the portal.

The registration process may include execution of a service agreement with the service provider. The service agreement may set out parameters of the print credits and/or consumption credits, and/or parameters for providing the particular print service for the account.

For example, the service agreement may specify a cost to print a page using particular consumable supply, which is applied as the print credit and/or consumption credit. The cost may be calculated based on parameters of the print job. Parameters of the print job may include a type of consumable, including type of ink or toner and media, and a print mode. As a specific example, the cost of a black and white printed page using a base quality mode of a print device may be set to two cents. The cost may be based on a model of the print device that is selected to execute the print job. If the user sets the print job to be in a higher quality mode of the print device, the cost per page may be more, such as four cents per page. Similarly, color print may be a different cost per page. Alternatively, in some examples, the cost may be a per page fee regardless of the parameters of the print job. In examples in which the service is for tracking consumption data, the service agreement may specify a cost per print page which is applied as a consumption credit, and which may be different amounts for different print job parameters.

During the registration process, a user may fund the account, such as by using a credit card, a bank account, or the like. The source of funds may be saved and used to automatically or manually refund the account. For example, a subscription service may include an automated fee per billing cycle, such as a monthly flat fee. An example monthly flat fee may include unlimited print pages for a fee per month, or a set number of print pages for a fee per month with a flat fee per page when the set number is exceeded. The amount of funds may be converted to data indicative of a number of pages that may be printed for the account in the billing cycle and/or balance information.

The computing devices 432-Q may be provided access to the first database 442 via the service manager 456 and the portal. For example, the portal provides another user interface, such as via the website or application, in which the user may search for a particular print device based on parameters.

The service manager 456 may monitor use of the printing services for respective users and across the print devices 446-P in connection with the services. As previously described, the service manager 456 may manage data by associating the usage data with respective accounts associated with users that request the print jobs and by associating the consumption data with respective accounts associated with print devices used to execute the print jobs, at 462 and 464. The service manager 456 may further monitor consumables of print devices 446-P based on the tracked consumption data and/or communications from the print devices 446-P.

Although specific examples have been illustrated and described herein, a variety of alternate and/or equivalent implementations may be substituted for the specific examples shown and described without departing from the scope of the present disclosure. This application is intended to cover any variations of the specific examples discussed herein. Therefore, it is intended that this disclosure be limited by the claims and the equivalents thereof.

The invention claimed is:

1. A method comprising:
providing access to a database of a plurality of print devices registered to a print system;
receiving print data that identifies a print job for a print device among the plurality of print devices and a first account for a first service and a first user of the print system;
managing the print job including:
applying a number of pages printed in the print job, as usage data for the print job, to the first account of the first user that generated the print job, based on the print data; and
applying an amount of consumables used in printing the print job, as consumption data for the print job, to a second account for the print device on which the print job is printed and that is not specific to the first user that generated the print job, based on the print data, the second account associated with a second service of the print system.

2. The method of claim 1, further including registering the plurality of print devices to the database, the plurality of print devices being inter-organizational.

3. The method of claim 1, further including providing the print job to the print device while keeping information associated with the first account confidential from the print device.

4. The method of claim 1, wherein applying the usage data includes deducting a print credit from a subscription plan for the first service, the subscription plan including a number of pages associated with the first account.

5. The method of claim 1, further including:
storing the database of the plurality of print devices based on a plurality of parameters of the plurality of print devices, wherein the plurality of parameters include geographic locations and capabilities of the plurality of print devices; and
providing the access to the plurality of print devices includes providing searchable access to the database to a user via a computing device.

6. The method of claim 1, further including:
tracking the usage data of a plurality of print jobs across the plurality of print devices, the plurality of print jobs including the print job; and
tracking the consumption data for the plurality of print jobs.

7. A non-transitory machine-readable storage medium storing instructions that when executed by a processor, cause the processor to:
register a plurality of print devices to a second database of a print system, the second database including a second account for each print device, the plurality of print devices forming a network of inter-organizational print devices;
register a plurality of users to a first database of the print system, the first database including a plurality of print services associated with a plurality of first accounts and the plurality of users respectively having the plurality of first accounts;
provide access to the first database to the plurality of users for a plurality of print jobs associated with the plurality of print services;
apply, for each print job, a number of pages printed in the print job as usage data to the first account associated with the user generating the print job; and apply, for each print job, an amount of consumables used in printing the print job, as consumption data to the second account on which the print job was printed regardless of the user generating the print job.

8. The machine-readable storage medium of claim 7, further including instructions to:
store identification of the plurality of print devices in the second database based on a plurality of parameters, the plurality of parameters including geographic locations and capabilities of the plurality of print devices; and
provide the access to the second database to the plurality of users based on the plurality parameters.

9. The machine-readable storage medium of claim 7, further including instructions to:
communicate an order form to a vendor for a consumable for a print device among the plurality of print devices based on the consumption data; and
dispatch the consumable to an address specified by the second account associated with the print device based on the order form and the second database.

10. The machine-readable storage medium of claim 7, further including instructions to provide the plurality of print jobs to respective print devices of the plurality of print devices as identified in received print data.

11. An apparatus comprising:
memory to store a set of instructions; and
a processor to execute the set of instructions to:
provide, to a plurality of users, access to a second database of a plurality of print devices registered to a print system, the second database including a second account for each print device, the plurality of users being registered in and having a respective plurality of first accounts in a first database of a plurality of print services of the print system;
identify a plurality of print jobs associated with the plurality of print services based on print data;
track usage data for the plurality of print jobs across the plurality of print devices;
apply, for each print job, a number of pages printed in the print job as usage data to the first account associated with the user generating the print job; and
apply, for each print job, an amount of consumables used in printing the print job, as consumption data to the second account on which the print job was printed regardless of the user generating the print job.

12. The apparatus of claim 11, wherein the processor is to further execute the instructions to route a print job to a print device among the plurality of print devices based on print data for the print job among the plurality of print jobs, while keeping billing data of the first account of the first plurality of accounts confidential from the print device, the first account being associated with the print job.

* * * * *